(12) United States Patent
Hernandez et al.

(10) Patent No.: US 8,112,534 B2
(45) Date of Patent: Feb. 7, 2012

(54) APPARATUS AND METHOD FOR REMOTE POWER CONTROL

(75) Inventors: Henrich Hernandez, Round Rock, TX (US); Shriram Patwardhan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 633 days.

(21) Appl. No.: 11/460,181

(22) Filed: Jul. 26, 2006

(65) Prior Publication Data

US 2008/0059641 A1    Mar. 6, 2008

(51) Int. Cl.
*G06F 15/16* (2006.01)
*G06F 15/173* (2006.01)

(52) U.S. Cl. .......................... 709/229; 709/224
(58) Field of Classification Search .................. 709/223, 709/224
See application file for complete search history.

(56) References Cited

U.S. PATENT DOCUMENTS

| | | | |
|---|---|---|---|
| 6,131,166 A * | 10/2000 | Wong-Insley | 713/300 |
| 6,393,570 B1 * | 5/2002 | Henderson et al. | 713/310 |
| 6,584,146 B2 * | 6/2003 | Bose et al. | 375/219 |
| 6,690,655 B1 | 2/2004 | Miner et al. | |
| 6,848,059 B2 | 1/2005 | Bullman et al. | |
| 6,961,581 B2 * | 11/2005 | Goto et al. | 455/522 |
| 7,099,934 B1 * | 8/2006 | Ewing et al. | 709/223 |
| 7,162,521 B2 * | 1/2007 | Ewing et al. | 709/223 |
| 7,185,229 B2 * | 2/2007 | Cromer et al. | 714/22 |
| 7,225,235 B2 * | 5/2007 | Garnett et al. | 709/217 |
| 7,272,732 B2 * | 9/2007 | Farkas et al. | 713/320 |
| 7,298,178 B1 * | 11/2007 | Sun et al. | 327/10 |
| 7,447,923 B2 * | 11/2008 | Bose et al. | 713/300 |
| 7,461,274 B2 * | 12/2008 | Merkin | 713/300 |
| 7,487,371 B2 * | 2/2009 | Simeral et al. | 713/300 |
| 7,688,838 B1 * | 3/2010 | Aloni et al. | 370/412 |
| 7,756,972 B2 * | 7/2010 | Ma | 709/224 |
| 2002/0198978 A1 * | 12/2002 | Watkins | 709/223 |
| 2004/0042483 A1 * | 3/2004 | Elzur et al. | 370/463 |
| 2004/0179546 A1 * | 9/2004 | McDaniel et al. | 370/463 |
| 2005/0097378 A1 * | 5/2005 | Hwang | 713/320 |
| 2005/0125519 A1 * | 6/2005 | Yang et al. | 709/223 |

* cited by examiner

*Primary Examiner* — Minh-Chau Nguyen
(74) *Attorney, Agent, or Firm* — Garrana Tran LLp; Andrea E. Tran

(57) ABSTRACT

An apparatus for remotely controlling power includes an information handling system platform a plurality of devices disposed on the platform, an interface in data communication with the first platform that receives a device request from a second platform, a monitor circuit that monitors one or more parameters, and a controller that controls a plurality of devices disposed on the platform, the control being based at least in part on the monitored one or more parameters and the device request. A method includes receiving at a first platform a device request from a second platform, monitoring one or more parameters, and controlling a plurality of devices disposed on the first platform using at least in part the monitored parameters and the device request.

17 Claims, 6 Drawing Sheets

APPARATUS AND METHOD FOR REMOTE POWER CONTROL

BACKGROUND

1. Technical Field

The present disclosure generally relates to apparatuses, methods and products in the field of information handling systems.

2. Background Information

As the value and use of information continues to increase, individuals and businesses seek additional ways to process and store information. One option available to users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

In one aspect, an information handling system apparatus is disclosed. The apparatus includes a first platform, a plurality of devices disposed on the platform, an interface in data communication with the first platform that receives a device request from a second platform, a monitor circuit that monitors one or more parameters, and a controller that controls a plurality of devices disposed on the platform, the control being based at least in part on the monitored one or more parameters and the device request.

Another aspect of the disclosure is a method including receiving at a first platform a device request from a second platform, monitoring one or more parameters, and controlling a plurality of devices disposed on the first platform using at least in part the monitored parameters and the device request.

Still another aspect is a computer-readable medium having stored thereon a data structure. The data structure includes a first field containing data representing resource requirements of a LOM when operated, a second field containing data representing total resource budget available on an information handling system platform, and a third field containing data representing an amount of resource budget in use on the platform wherein the third field and the second field are combinable for determining whether sufficient resources are available to accommodate a device request requesting that the LOM be activated.

BRIEF DESCRIPTION OF THE DRAWINGS

For detailed understanding of the present disclosure, references should be made to the following detailed description of the several aspects taken in conjunction with the accompanying drawings, in which like elements have been given like numerals and wherein.

DESCRIPTION OF EXEMPLARY EMBODIMENTS

For purposes of this disclosure, an information handling system may include, but is not limited to, any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
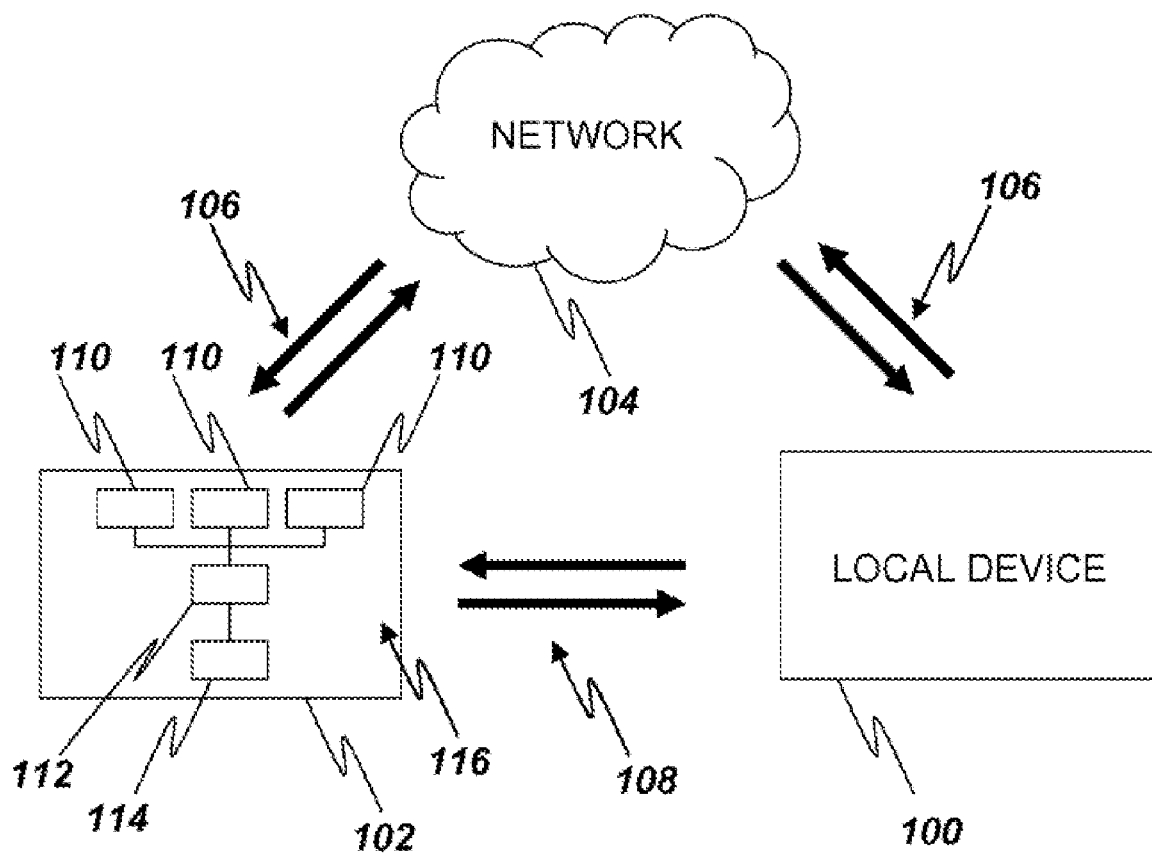
FIG. 1 schematically illustrates a non-limiting example of a local device communicating with a remote device.

FIG. 1 schematically illustrates a non-limiting example of an information handling system local device 100 in data communication with an information handling system remote device 102. The present disclosure is not limited to any particular data communication interface. For example, the local device 100 may communicate with the remote device 102 via a network 104 via a network interface 106, or the local device 100 may communicate with the remote device 102 via a direct communication interface 108. The network interface 106 may include any number of suitable interfaces including, but not limited to, a wireless interface, a cable interface and an optical interface. The direct interface 108 may include any number of suitable interfaces including, but not limited to, a wireless interface, a cable interface and an optical interface. Each interface 106, 108 may be bi-directional.

The network 104, when used, is not limited to any particular network and may include, but is not limited to, a local area network (LAN), a wide area network (WAN), an intranet and the internet.

The local device 100 may be any suitable local device for communicating with a remote device. Non-limiting examples of local devices include an information handling system, a computer, a server, a telephone, and a radio transmitter/receiver.

The remote device 102 likewise may be any suitable device where remote access to the remote device is desirable. Non-limiting examples of local devices include an information handling system, a computer, a server, a telephone, and a radio transmitter/receiver.

In one aspect, the remote device 102 may include a hardware platform 116, or simply platform 116, having a number of devices 110, a monitoring circuit 112 and a controller 114. In one aspect, the remote device platform 116 may receive a device request from the local device 100 via the interface 106, 108. The device request received at the platform 116 may then be evaluated by the controller 114.

In one aspect, the monitoring circuit 112 may be used to monitor one or more parameters of the platform and/or of the devices 110. The monitoring circuit may then provide an output signal, which may be used by the controller 114 to evaluate the device request.

For example, the device request may include a request to activate one of the several devices 110. In this example, the monitoring circuit 112 may be used to monitor total power already in use by the platform and provide a signal representing the total power in use to the controller 114. The controller 114 may then evaluate the device request to determine whether the requested device may be activated without imposing a burden on the platform resources.

In one aspect, when a device request cannot be accommodated, the remote device 102 may communicate back to the local device 100 providing a signal indicating that the remote platform 116 has unavailable resources to accommodate the request. In one aspect, the remote device platform controller may automatically deny the device request by gating the requested device without activating the requested device. In one non-limiting aspect, the remote device platform controller may automatically initiate a device hierarchy to automatically deactivate one or more currently activated devices in order to accommodate the device request.

Figure 2:
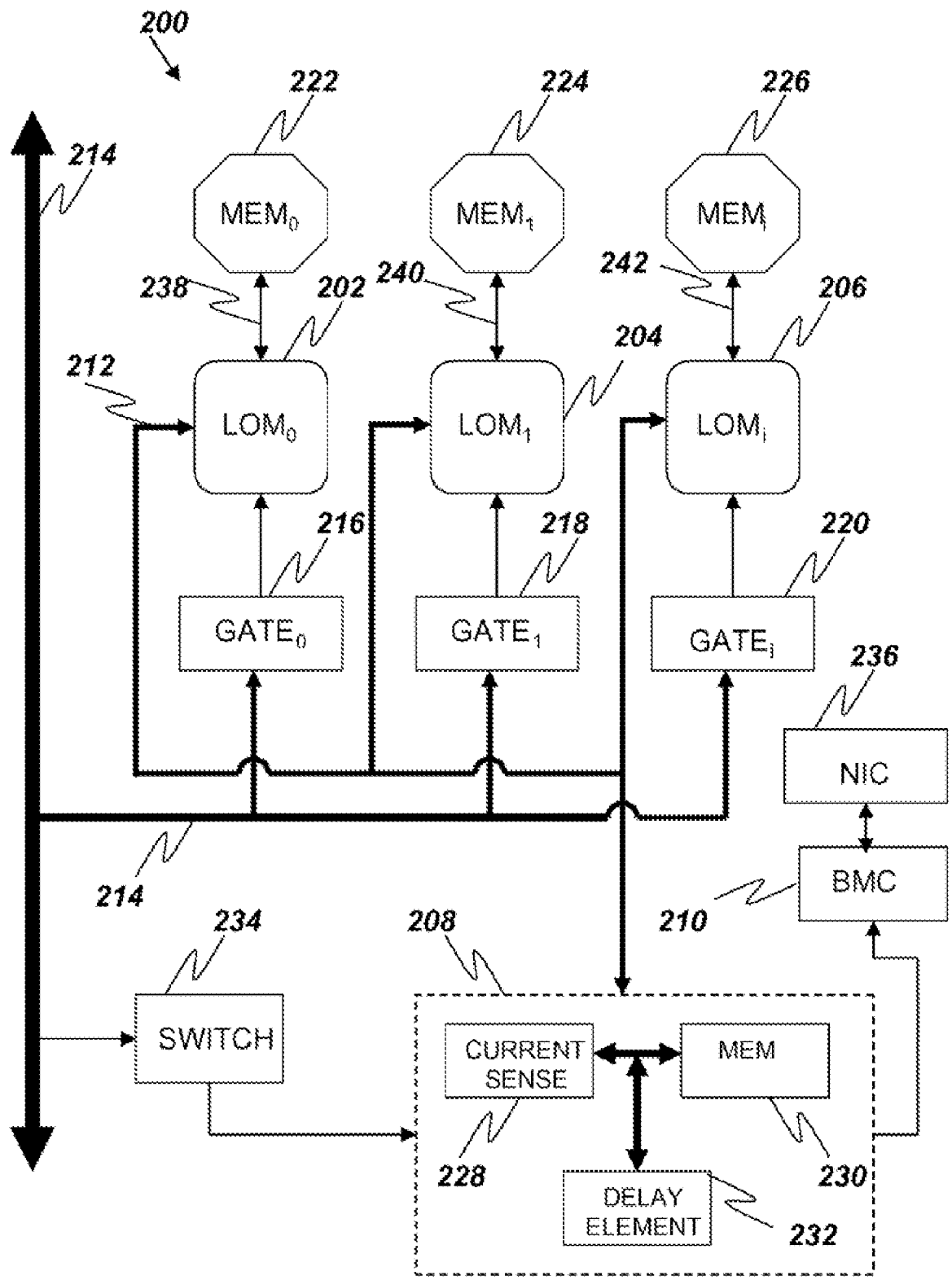
FIG. 2 schematically illustrates a non-limiting example of a remote device platform with several LOM devices.

FIG. 2 schematically illustrates a non-limiting example of a remote device platform 200 with several devices 202, 204, 206 disposed thereon. While the disclosure is not limited to any particular device, the devices shown include LAN-On-Motherboard (LOM) devices $LOM_0$, $LOM_1$ through $LOM_i$, where i is the number of individual devices.

In the non-limiting example configuration shown, a monitoring and control circuit 208 may be in data communication with a baseboard management controller (BMC) 210, which may comprise microcontroller for managing the interface between system management software and platform hardware. The control circuit 208 may further be in data communication with the several LOM devices 202, 204, 206 via a bus 212. The bus 212 may further be part of a system management bus (SMBus). The platform 200 may communicate with another platform or any other information handling system, device or component via a suitable interface 236, which may include, but which is not limited to, a network interface card (NIC), a modem, and an electromagnetic or other wireless interface.

In one aspect, a power rail 214 may be used to provide electrical power to the several LOM devices 202, 204, 206. As a non-limiting example, the power rail 214 may comprise an auxiliary power rail. The power rail 214 may provide controlled electrical power to each of the LOM devices using power gates 216, 218, 220. For example, $GATE_0$ may control power to $LOM_0$, $GATE_1$ may control power to $LOM_1$, and so on to $GATE_i$ controlling power to $LOM_i$. While individually gated LOM devices are shown, the present disclosure contemplates and includes the use of a combination of gates controlling power to one or more devices and includes a single gate controlling power to more than one device.

In one non-limiting aspect, a memory 222, 224, 226 may be associated with a respective LOM device. The memory 222, 224, 226 may be, for example, a non-volatile memory such as Read Only Memory (ROM), an electrically-erasable programmable ROM (EEPROM), a non-volatile Random Access Memory (NVRAM) or any other suitable memory. Furthermore, each memory 222, 224, 226 need not be the same memory type. In some applications, it may be desirable to use one memory typr for one LOM device and another memory type for a second device, which may or may not be a LOM device. The memory 222, 224, 226 is in data communication with each LOM device via one or more clock/data interfaces 238, 240, 242. Any suitable interface capable of providing data communication between the memory and LOM devices may be used. Furthermore the memory 222, 224, 226 may be packaged as a single memory device or multiple devices.

In one non-limiting aspect, the controller 208 comprises a power monitor and control (PMC) circuit including a current sense circuit, a memory 230 and a delay element 232. The current sense circuit may be in data communication with each of the delay element 323 and the memory 230. The memory 230 may be in data communication with each of the current sense circuit and the delay element and the delay element may be in data communication with each of the current sense circuit 228 and the memory 230.

In one aspect the PMC 208 receives information regarding power available on the power bus 214 via a switching mechanism 234. The switching mechanism 234 may be any number of suitable switching mechanisms, non-limiting examples of which include a switching transistor and a logic device. One type of switching transistor may include a field-effect transistor (FET). One type of logic device useful as a switching mechanism may include a complex programmable logic device (CPLD). The switching mechanism 234 may be used as a monitoring device for monitoring a system power state to activate the PMC 208 when, for example, the power state may be a peripheral component interconnect (PCI) power state such as D3hot. Those skilled in the art would recognize D3hot state as being one of several PCI power management states useful in wake-on-LAN (WOL) applications. The power states may be any of D0 State-Full On; D0 Uninitialized; D0 Active; D1 State-Light Sleep; D2 State-Deep Sleep; D3-Full Off; D3Hot State; and D3Cold State.

In operation information handling system platforms 116, 200 as those described above and shown in FIGS. 1 and 2 may comprise any number of information handling system types, non-limiting examples of which may include a computer, a server, a server blade, a telephone, audio-visual devices, and/or any other device which includes a processor. These several types of platforms may be used in any number of applications. In one non-limiting aspect, the platforms may be used in a wake-on-LAN application, wherein a local platform sends a device request to a remote platform to activate one or more devices on the remote platform.

In one non-limiting operational aspect, a user at a local platform may send a device request to a remote platform 200, which receives the device request via the interface 236. The device request may be in the form of a so-called magic packet, which is a data packet including instructions to activate (or awaken) a device on the remote platform 200.

Various parameters are stored in the PMC 208 memory 230. Non-limiting examples of stored parameters include total system resource budget and number of devices in the system. The resource budget may include total auxiliary power and/or current budget available to supply the several LOM devices 202, 204, 206. When the remote platform 200 is in a low power state, the auxiliary power provided to the several LOM devices is controlled via the gate circuits 216, 218, 220.

Device requests such as a WOL request received during a low power state may be used to activate the PMC 208. In one aspect, each LOM device 202, 204, 206 has associated therewith operational specification parameters such as power requirements, which may be expressed as a current requirement. The specification parameter may be stored in a memory $MEM_i$ associated with a particular $LOM_i$ device. The designations $MEM_i$ and $LOM_i$ device means respective devices, which includes any respective devices such as $MEM_0$ associated with $LOM_0$, $MEM_1$ associated with $LOM_1$, and so on through $MEM_i$ associated with $LOM_i$. Each $LOM_i$ device may further include an enable/disable parameter also stored in the respective memory 222, 224, 226. The individual $LOM_i$ device parameters may be transferred to the PMC memory 230 via the SMBus 212.

The PMC circuit 208 may then be used to sense the resources (power/current budget) already in use, and data relating to the total resources in use may be transferred to the PMC circuit memory 230.

Preprogrammed instructions executed by a processor on the remote platform 200 may be used to index through each $LOM_i$ device upon receiving the device request to determine whether a particular $LOM_i$ device is enabled. Where the $LOM_i$ device is enabled, the processor determines from the stored parameters whether the power requirement for the particular $LOM_i$ device exceeds the available resource budget. Where there are resources available, the respective gate 216, 218, 219 to the $LOM_i$ device is then enabled to pass power to the selected LOM device. The preprogrammed instructions may then go on to the next $LOM_i$ device and perform the same determinations as to whether to apply power to the $LOM_i$ device. The sequence may be performed until all WOL-enabled $LOM_i$ devices are powered and/or until available resources have been allocated.

In one non-limiting aspect, the PMC delay element 232 may be used to delay power applied to the selected LOM device for a sufficient time to account for any current spike generated by activating the LOM device. The delay may be used to ensure the total resource used parameter is representative of the operating current in use.

In one non-limiting aspect, the determination of available resources for a particular LOM device may result in a determination that insufficient resources exist to power the particular LOM device. In such cases, the associated gate 216, 218, 220 may be used to block power to the selected LOM device.

In one non-limiting aspect, a signal may be generated and transmitted to the BMC 210 to notify a user that the selected device will not function (even if enabled) due to insufficient platform resources. The user may be prompted to disable other LOM devices to reallocate resources to power the selected LOM device.

In another non-limiting aspect, the remote platform BMC 210 or other controller may be used to initiate an automatic hierarchy routine to automatically disable other devices already in use thereby increasing the available resources. The hierarchy routine may also automatically enable the gate to the selected LOM device for operation. Appropriate messages may be sent to the user regarding the automatically disabled devices and that system resources were reallocated to accommodate the device request.

The platform monitoring circuits 234, 228 and power budget information stored in memory allow the PMC 208 and/or other controllers 210 to process the device request and to determine whether sufficient platform resources, for example power, are available to accommodate the device request.

Figure 3:
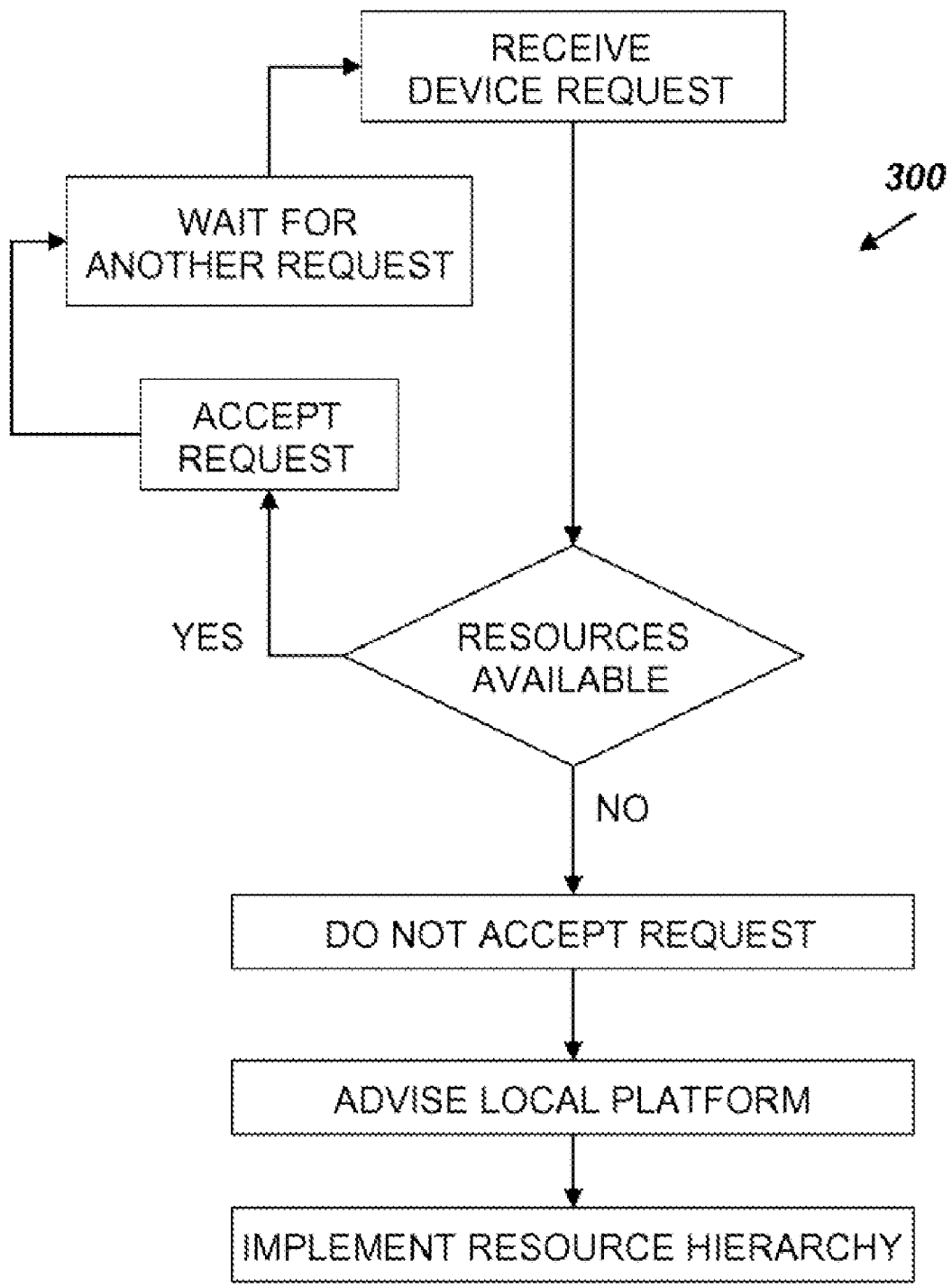
FIG. 3 illustrates a non-limiting example of a method for controlling devices on a platform.

Having described several apparatus and operational aspects of the disclosure, FIG. 3 illustrates a non-limiting example of a method 300 for controlling devices on an information handling system platform, such as, but not being limited to, platforms 116, 200 as described above and shown in FIGS. 1 and 2. The method includes receiving a device request at a remote platform. The method further includes determining whether sufficient platform resources are available to accommodate the device request. Where sufficient resources are available, the request may be accepted and the information handling system may then wait for another request. Where insufficient platform resources are available to accommodate the device request, the request may not be accepted. Optionally, the information handling system may advise the local platform sending the device request that the request will not be accommodated. Additionally, another non-limiting aspect may include implementing a resource hierarchy at the remote device. The hierarchy may be used to determine whether platform resources should be reallocated in order to accommodate the current device request.

Figure 4A:
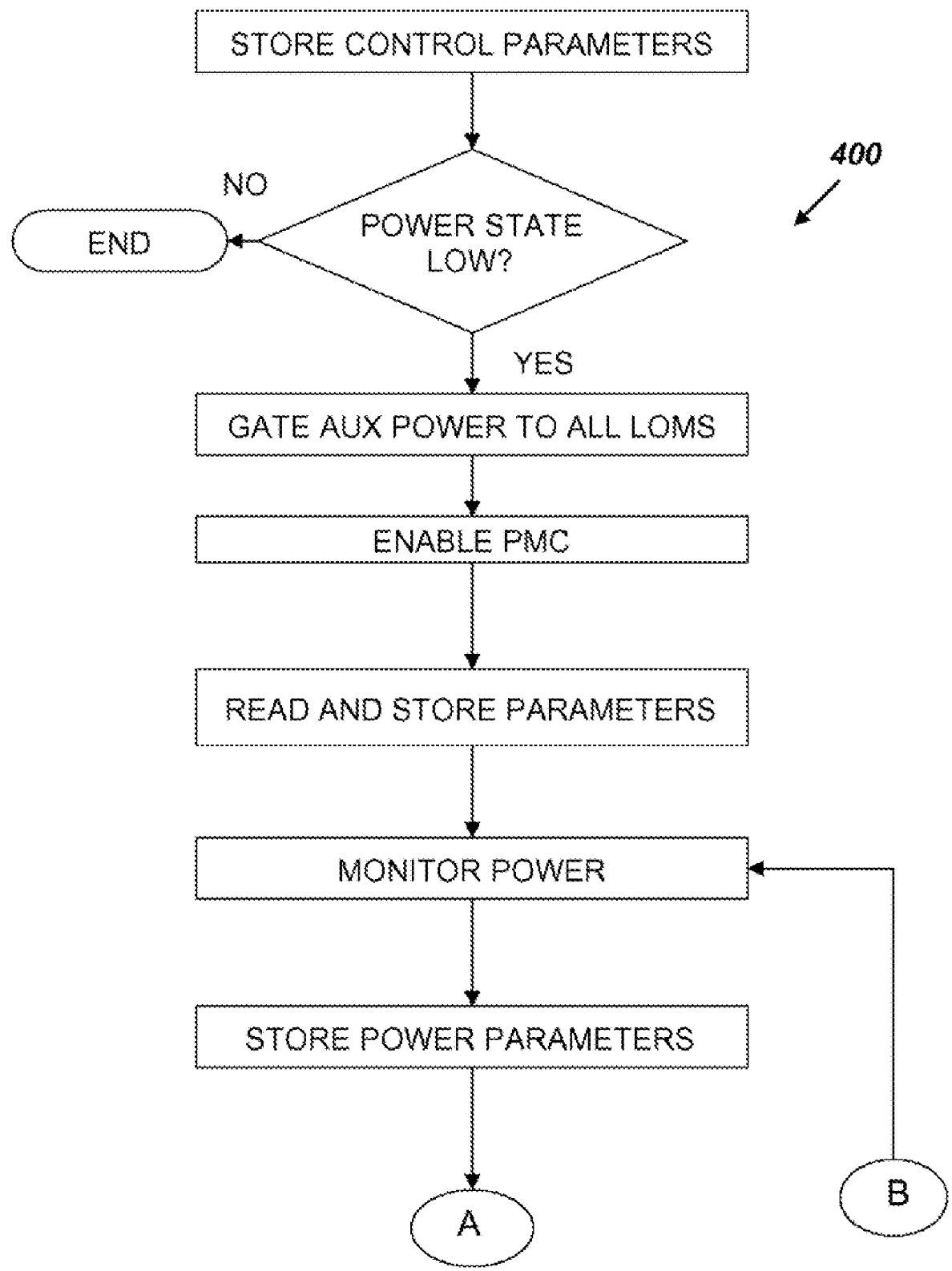
FIGS. 4A-4B illustrate another non-limiting example of a method for controlling devices on a platform.
Figure 4B:
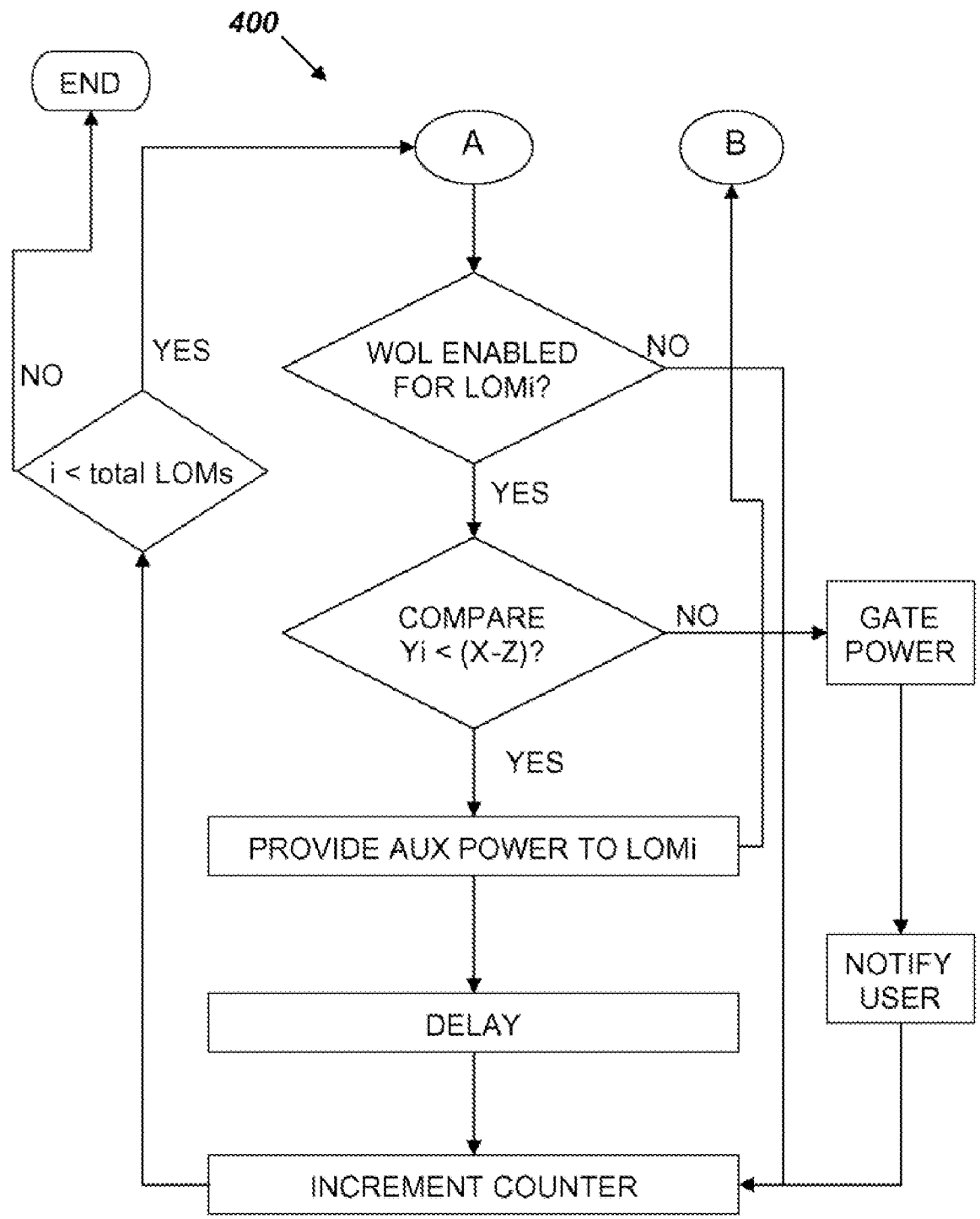

FIGS. 4A-4B illustrate another non-limiting example of a method 400 for controlling devices on a platform. The method may begin by storing or preprogramming information handling system parameters on an information handling system platform memory. The parameters stored my include total system resource budget information "X" and a total number "i" of devices on the information handling system platform. A decision may be made to determine whether the platform is in a low power state. In one aspect a PCI D3Hot signal is monitored to determine the system state.

In one non-limiting aspect, the method 400 includes gating power to all LOM devices when the platform is in a low power state and enabling the PMC circuit.

Still referring to FIG. 4A, the non-limiting method example shown includes reading parameters associated with the several LOM devices and storing the parameters in a memory. In one aspect, the memory is used by the PMC, which memory may include an NVRAM memory. In one aspect, the parameters read include WOL settings and/or minimum power required for each LOM device WOL operation. The minimum power requirement may be the same or different for each LOM device and may be obtained through the particular device specification. The low power requirement may, for example, include a lower limit current specification expressed as $Y_0$ mA for $LOM_0$, $Y_1$ mA for $LOM_1$ though $Y_i$ mA for $LOM_i$. The WOL settings may, for example, include an enable/disable setting, which will indicate whether a particular LOM device is enabled for WOL operation. Reading the parameters may include reading the parameters from memory associated with the LOM devices. In one aspect, each LOM device has a memory associated with that LOM device. In one aspect, the memory may include an NVRAM memory.

Still referring to the non-limiting example of FIG. 4A, the method includes monitoring or sensing the power used, which sensing may include, but is not limited to, sensing the current drawn on the auxiliary power rail of the information handling system platform power supply. The sensed power may then be stored as power parameters in a memory. In one aspect storing the power parameters includes storing the power parameters a memory used by the PMC, which memory may include an NVRAM memory NVRAM memory. The power used may be stored in the memory as data, which may be expressed as Z and which may represent current drawn in mA.

Referring to FIG. 4B, the non-limiting method example may include determining whether a particular LOM is enabled for WOL. A counter "i" may be initialized to "0" to begin the determination with $LOM_0$. When the determination is that a particular $LOM_i$ is enabled for WOL, the method includes determining whether there exists enough resources to accommodate activation of the particular $LOM_i$. For example, determining whether sufficient resources are available may include determining whether $Y_i<(X-Z)$.

Where there is inadequate resources available, for example $Y_i>(X-Z)$, then the method may include gating or blocking auxiliary power to the particular $LOM_i$. The method may further include sending a signal to a user interface to notify a user that insufficient resources exist. For example without limitation, a signal may be sent to the platform BMC to produce a dialog box on a user interface. A notice may include a notification that the selected LOM will not be functional due to insufficient auxiliary system power. The notice may further provide direction to the user. As a non-limiting example, a direction may include directing the user to disable WOL on one or more other LOM devices and/or NICs in order to use WOL on $LOM_i$. In one aspect, the method then includes incrementing the counter i and determining whether there exists another $LOM_i$. A next $LOM_i$, if existing, will go through the same determining whether the $LOM_i$ is enabled and whether there exists sufficient auxiliary power to operate that $LOM_i$.

Where there is adequate resources available, for example $Y_i<(X-Z)$, then the method may include providing power to that $LOM_i$. In one non-limiting aspect, a delay may be added to account for initial current spikes associated with providing power to $LOM_i$. In one aspect, the time of delay may be programmed into the PMC and may be a delay in increments of milliseconds.

Once $LOM_i$ has been activated, the method may then include incrementing the counter i and determining whether there exists another $LOM_i$. A next $LOM_i$, if existing, will go through the same determining whether the $LOM_i$ is enabled and whether there exists sufficient auxiliary power to operate that $LOM_i$.

Figure 5:
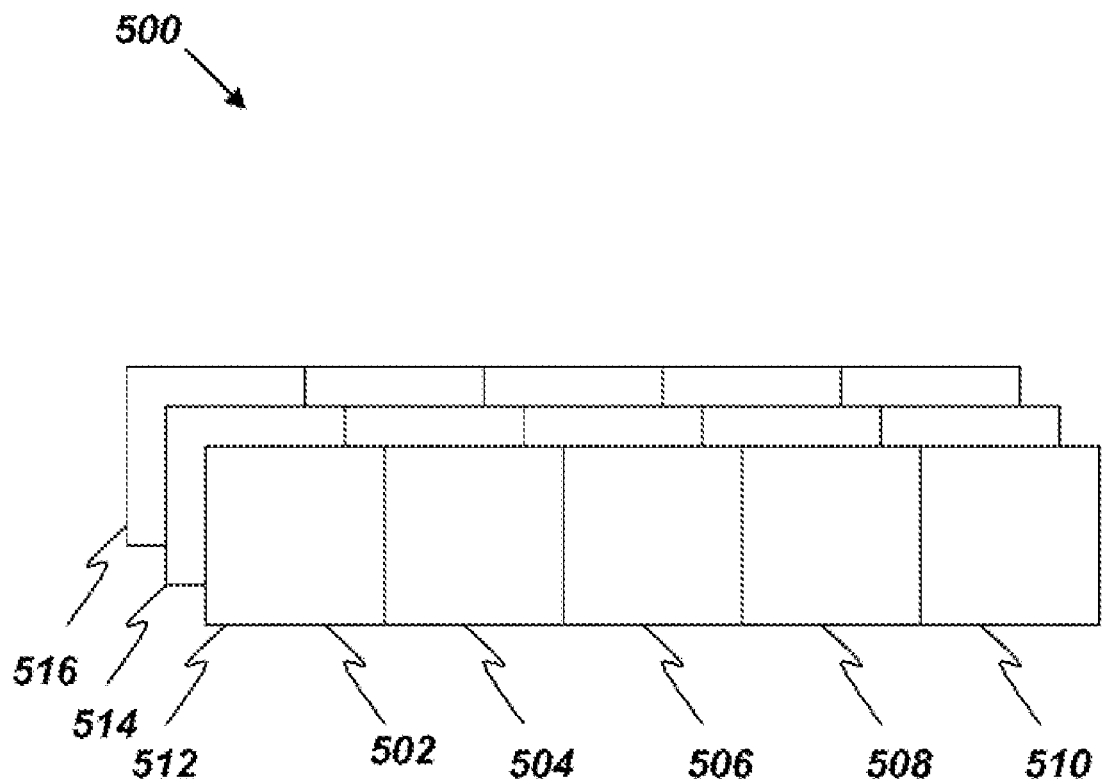
FIG. 5 illustrates a non-limiting example of a data structure.

FIG. 5 illustrates a non-limiting example a data structure 500, which may be stored in a computer-readable medium such as the NVRAM 222, 224, 226 associated with a respective $LOM_i$ 202, 204, 206. In other non-limiting aspects, the data structure may alternatively or may also be stored on a memory such as an NVRAM 230 associated with the PMC 208 or any other suitable memory associated with the information handling system platform 200. The data structure may include any number of fields representing, for example, total resource budget ans resource allocation for devices such as the LOM devices 202, 204, 206. For example, field TOT_BUDGET 502 includes data indicative of the total resource budget available and field RES_TYPE 504 includes data indicative of the type of platform resource, for example power. Field LOM_REQ 506 may include data indicative of the particular $LOM_i$ resource requirements, and field BUDGET_USED 508 may include data indicative of the platform resources already in use. The data structure may include field WOL_EN 510, which may be indicative of whether the particular LOM is enabled for WOL operation. The fields may be combined and/or read as a whole to indicate whether sufficient resources exist to allow WOL of a particular LOM device when a device request is received by the platform. FIG. 5 illustrates a multi-level multi-field data structure. The number of fields and levels may be more or less depending on the desired amount of resource and device information desired for a particular platform. In the non-limiting example shown, each level 512, 514, 516 relates to a particular LOM device. The above aspects are provided to illustrate examples of data structures and uses within the scope of the disclosure and the examples are to be considered non-exhaustive and non-limiting.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, use of equivalent functional couplings for couplings described herein, and/or use of equivalent functional actions for actions described herein. Such insubstantial variations are to be considered within the scope of the claims below.

Given the above disclosure of general concepts and specific embodiments, the scope of protection is defined by the claims appended hereto. The issued claims are not to be taken as limiting Applicant's right to claim disclosed, but not yet literally claimed subject matter by way of one or more further applications including those filed pursuant to the laws of the United States and/or international treaty.

What is claimed is:

1. A method comprising:
   receiving at a first platform a device request from a remote second platform, wherein the first platform comprises a first processor and available power resources including Vaux, the second platform comprising a second processor;
   monitoring one or more parameters within the first platform;
   controlling a plurality of LAN-on-Motherboards (LOM's) disposed on the first platform using at least in part the monitored parameters and the LOM's Wake-on-Lan (WOL) request, wherein controlling the LOM's comprises managing power to one or more of the plurality of LOM's so as not to exceed available Vaux power resources of the first platform;
   providing an indication when power is not supplied to one of said plurality of LOM's when acting on a WOL request;
   and comparing the monitored parameters with initial parameters and if the monitored parameters do not exceed the initial parameters, selectively deactivating the WOL functionality on one of said plurality of LOM's to allow a WOL request on another one of said plurality of LOM's.

2. The method of claim 1, wherein the initial parameters include a power resource budget.

3. The method of claim 2, wherein the power resource budget includes a total amount of power available on the first platform for supplying power to the plurality of LOM's.

4. The method of claim 2, wherein monitoring one or more parameters includes monitoring an amount of Vaux power used.

5. The method of claim 2, wherein the initial parameters include power required to power one of the plurality of LOM's and requests from Network Interface Cards (NIC's) disposed on the first platform.

6. The method of claim 1 further comprising sending a signal representative of Vaux power to a user interface.

7. The method of claim 6, wherein the signal is used to notify a user that insufficient Vaux power is available to fulfill the LOM's request.

8. The method of claim 6, wherein the signal is used to notify a user that insufficient Vaux power is available to fulfill the LOM's request and requests from Network Interface Cards (NIC's) disposed on the first platform.

9. The method of claim 1 further comprising determining from the comparison whether sufficient resources are available to accommodate the LOM's WOL request or delay the same.

10. The method of claim 1 further comprising determining from the comparison whether sufficient resources are available to accommodate the LOM's request and requests from Network Interface Cards (NIC's) disposed on the first platform.

11. An information handling system comprising:
a first platform comprising a first processor and available power resources;
a plurality of devices disposed on the first platform including a plurality of LAN-on-motherboards (LOM's);
an interface in data communication with the first platform, the interface receiving a LOM Wake-on-Lan (WOL) request from a remote second platform, the second platform comprising a second processor;
a monitor circuit in data communication with the first platform, the monitor circuit monitoring one or more parameters of said plurality of devices; and
a controller in data communication with the first platform that controls power to one or more of the plurality of LOM's, the control being based at least in part on the monitored one or more parameters of said plurality of LOM's and the WOL request, wherein the controller manages power of said one or more of the plurality of LOM's when acting on any said WOL request to not exceed said available power resources of the first platform;
the first platform providing an indication when power is not supplied to one of said plurality of LOM's when acting on a WOL request; and
a memory device having stored thereon initial device parameters used for comparison with the monitored parameters and wherein if the monitored parameters do not exceed the initial device parameters, the WOL functionality is configured to selectively deactivate on one of said plurality of LOM's to allow a WOL request on another one of said plurality of LOM's.

12. The system of claim 11, wherein the first platform is selected from i) a computer, ii) a server, iii) a server blade, and iv) a telephone system.

13. The system of claim 11, wherein the monitor circuit includes one or more of a CPLD and an FET.

14. The system of claim 11, wherein the WOL request is subject to delay and the control includes controlling the platform's Vaux power applied to the LOM's.

15. The system of claim 11, wherein the controller comprises one or more of a current sense circuit to monitor the platform's Vaux power supply.

16. The system of claim 11, wherein the controller comprises one or more of a current sense circuit, a delay element and a memory.

17. A non-transitory computer-readable medium having stored thereon a data structure comprising:
a first field containing data representing resource requirements of a plurality of LAN-on-motherboard (LOM's) when operated;
a second field containing data representing total resource budget available on a first information handling system platform, the first information handling system platform comprising a first processor;
a third field containing data representing an amount of a power resource budget in use on the platform, wherein at least one of the first field, second field or third field are utilized for determining whether sufficient power resources are available to accommodate a LOM's request from a remote second information handling system platform requesting that the LOM's be activated, wherein the second information handling system platform comprises a second processor;
a fourth data field containing data directing the first information handling system platform to manage the power of one or more said LOM's if there are not sufficient resources to accommodate the most recent LOM's request;
a fifth data field containing data directing the first information handling system to provide an indication when power is not supplied to one of said plurality of LOM's when acting on a request from a remote second information handling system platform that one of the LOM's be activated; and
a sixth field containing data allowing the first information handling system to selectively deactivate one or more of said plurality of LOM's to allow another of said LOM's to be activated.

* * * * *

UNITED STATES PATENT AND TRADEMARK OFFICE
CERTIFICATE OF CORRECTION

| | |
|---|---|
| PATENT NO. | : 8,112,534 B2 |
| APPLICATION NO. | : 11/460181 |
| DATED | : February 7, 2012 |
| INVENTOR(S) | : Hernandez et al. |

Page 1 of 1

It is certified that error appears in the above-identified patent and that said Letters Patent is hereby corrected as shown below:

On the Title Page

Item (75) Inventors
Insert --Hendrich M. Hernandez-- and delete "Henrich Hernandez".

Signed and Sealed this
First Day of October, 2013

Teresa Stanek Rea
*Deputy Director of the United States Patent and Trademark Office*